United States Patent Office 3,194,845
Patented July 13, 1965

3,194,845
NITROCYCLOHEXANE MANUFACTURING PROCESS
Bernard Taub, Williamsville, and John B. Hino, Buffalo, N.Y., assignors to Allied Chemical Corporation, New York, N.Y., a corporation of New York
No Drawing. Filed Feb. 24, 1964, Ser. No. 347,052
12 Claims. (Cl. 260—644)

This invention relates to a method for producing pure nitrocyclohexane from a (1-nitrocyclohexyl) lower alkanol.

Nitrocyclohexane is an important intermediate in the synthesis of a number of industrially significant compounds, such as cyclohexylamine, and cyclohexanone oxime. In general, nitrocyclohexane is converted to these valuable products by a process which involves catalytic reduction, and accordingly it is usually advantageous to utilize highly purified nitrocyclohexane.

Nitrocyclohexane is prepared by the nitration of cyclohexane. As obtained from such a process the product is highly colored, being associated with a number of by-products such as polynitrocyclohexanes, cyclohexanone, cyclohexanol, cyclohexyl nitrite, adipic acid, cyclohexyl ethers and the like as well as the nitrating agent and oxides of nitrogen. Inasmuch as many of these associated impurities, although present in relatively minute quantities, are known to have undesirable effects when present during the subsequent processing of the nitrocyclohexane, their removal in an efficient and economical manner is highly desirable. The accomplishment of this end by known procedures, many of which involve the application of heat to the thermally sensitive, explosive, crude nitrocyclohexane mixture, leaves much to be desired in both efficiency and practicality.

Accordingly, it is a principal object of this invention to devise an effective process for the manufacture of pure nitrocyclohexane from a (1-nitrocyclohexyl) lower alkanol.

Other objects and advantages will become apparent from the following detailed description of our invention.

In accordance with the invention we discovered that when compounds of the formula

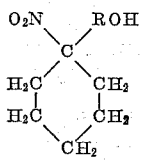

wherein R is a methylene or lower alkyl substituted methylene radical of preferably 1–3 carbon atoms, are heated, preferably distilled with steam, essentially pure nitrocyclohexane can be recovered from the oily portion of the distillate. The known (1-nitrocyclohexyl) lower alkanols represented by the above structural formula can be obtained in any known manner from the originally available impure nitrocyclohexane by a base-catalyzed condensation with a corresponding aldehyde, whereby if the aldehyde is formaldehyde, (1-nitrocyclohexyl)-methanol is obtained; and when the aldehyde is acetaldehyde 1-(1-nitrocyclohexyl)ethanol is obtained, in a known manner.

According to a preferred embodiment of the invention, crude nitrocyclohexane, which contains impurities, is condensed in the presence of a basic catalyst with formaldehyde at substantially room temperature. The aqueous mixture which contains principally (1-nitrocyclohexyl)methanol can be subjected to further treatment in its alkaline form, or in the alternative, can be neutralized, or acidified; the pH of the mixture having no substantial effect upon the subsequent steps. The mixture is then heated to boiling and distilled with steam until no further oil distillate is collected. The oil layer of the distillate is separated and redistilled to give nitrocyclohexane of a purity in excess of 99%. If desired, further amounts of nitrocyclohexane can be extracted from the aqueous portion of the distillate.

The process of the invention is also suitable for the repurification of already purified nitrocyclohexane.

The following examples illustrate the best mode contemplated of carrying out the novel process of our invention. It is to be understood that the following examples are not to be interpreted as limiting the invention to all details of the examples. Parts and percentages are by weight and temperatures are given in degrees centigrade.

Example I 500 parts of crude nitrocyclohexane obtained by the vapor phase nitration of cyclohexane with nitrogen tetroxide, and contaminated with nitrogen tetroxide, nitrogen dioxide, adipic acid, cylclohexanone, cyclohexanol, polynitrocyclohexanes and the like, was given three successive washes, each with 100 parts of water. The washed nitrocyclohexane contained 77% nitrocyclohexane as determined by chromatographic analysis, or 385 parts. To this were added 30 parts of 10% aqueous solution of caustic soda and then dropwise 314 parts of 37% aqueous solution of formaldehyde. The latter addition was made within about one hour. The reaction mixture was agitated during the addition and was maintained at 25° to 30°. Thereafter the mixture was agitated for one hour and then made just acid by the addition of about 40 parts of 10% aqueous sulfuric acid. The mixture was steam distilled until the distillate ran clear. The oil layer of the distillate was separated and redistilled to yield 318 parts of nitrocyclohexane boiling at 75°/8 mm. The aqueous fraction of the steam distillate was extracted with benzene to provide an additional 14 parts of nitrocyclohexane. A total recovery of 332 parts of pure nitrocyclohexane, or 83% recovery, was thereby accomplished.

Example II 103 parts of crude nitrocyclohexane were washed with four portions of distilled water, 50 parts each, and the washed product was divided into two nearly equal portions.

One portion (46 parts) was mixed with 2 parts of a 10% aqueous caustic soda solution and to this mixture were added 32 parts of a 37% aqueous formaldehyde solution, as described in Example I. The resulting mixture was rendered just acid by the addition of 4 parts of 10% aqueous sulfuric acid and the mass was distilled with steam. The oily fraction of the distillate was separated and redistilled to yield 24.4 parts of 99.4% pure nitrocyclohexane, having a boiling point of 75°–76° at 8.3 mm. Hg pressure.

The other portion of the washed nitrocyclohexane was treated with formaldehyde and 2 parts of 10% aqueous caustic soda solution was added as described above, but the reaction mixture was not acidified before steam distillation. In this instance the 25 parts 99.4% pure nitrocyclohexane were obtained, having a boiling point of 75° to 76°, at 8.3 mm. Hg pressure.

Example III 200 parts of purified, 99.3% pure, nitrocyclohexane were treated with 8 parts of a 10% aqueous solution of sodium hydroxide and 122 parts of a 37% aqueous formaldehyde solution, as described in Example I. After acidification of the reaction mixture with 12 parts of a 10% aqueous sulfuric acid solution, the mass was distilled and the oil layer obtained was redistilled. Nitrocyclohexane of 99.8% purity was obtained.

*Example IV*

Part A.—To a mixture containing 200 parts of pure nitrocyclohexane and 8 parts of a 10% aqueous sodium hydroxide solution, 122 parts of a 37% aqueous formaldehyde solution were added dropwise, while maintaining the mixture at 25° to 30°. Thereafter the mass was vigorously agitated for 3 hours and 12 parts of a 10% aqueous sulfuric acid solution were added.

The acidified mixture was permitted to separate into two layers. The oil layer was dissolved in about 260 parts of benzene. The benzene solution was washed with two, each being 100 part, portions of water, with two, each being 100 part, portions of a 10% aqueous sodium bisulfite solution, and finally again with two, each being 100 part, portions of water.

The washed solution was distilled to remove benzene and water and the residue was distilled in vacuum, yielding 205 parts of (1-nitrocyclohexyl)methanol, boiling at 134° and at 8 mm. Hg pressure.

Part B.—A mixture of 50 parts of (1-nitrocyclohexyl) methanol, obtained as described in Part A, and 200 parts of water was distilled with steam until 350 parts of distillate was collected. No further oil distilled. The aqueous distillate was extracted with ether and the extract was dried over anhydrous sodium sulfate. The ether was evaporated from the extract and the residue distilled in vacuum yielding pure nitrocyclohexane, boiling at 75° and at 8 mm. Hg pressure.

Part C.—The procedure of Part B was repeated using 300 parts of water, and the mixture was acidified with 10 parts of 10% aqueous sulfuric acid prior to distillation. 200 parts of distillate was collected before extracting nitrocyclohexane therefrom.

Part D.—The procedure of Part B was repeated with the exception that prior to the distillation step the mixture was made alkaline with 10 parts of a 15% aqueous sodium hydroxide solution. From the distillate, which was 200 parts, nitrocyclohexane was obtained by extraction with ether.

It can be seen that our novel process provides a simple and effective method for the recovery of pure nitrocyclohexane from crude reaction products, and the pH of the reaction mixture containing the (1-nitrocyclohexyl)-methanol is not critical.

It is to be understood that variations of the process of the invention, above and beyond those steps used in the examples, can be employed.

Thus, other basic substances can be used to catalyze the reaction between nitrocyclohexane and aldehyde. Examples of such other catalysts are potassium hydroxide, trisodium phosphate, alkali carbonates, bicarbonates, earth alkali salts, organic bases such as sodium methylate, methylamine, pyridine and piperidine.

Further, acids other than sulfuric acid can be used to neutralize or acidify, if desired, the alkaline reaction mixtures. Such other acids include acetic, formic, phosphoric, hydrochloric acids and the like. Oxidizing acids such as nitric acid, especially in diluted state, can be used but are not recommended because of their oxidative tendencies.

The amount of acid used, if so desired, can vary over a considerable range, but preferably an amount of acid sufficient to render the mass neutral to just acid is used. Too much acid should be avoided since at considerably stronger acid concentrations (1-nitrocyclohexyl)methanol decomposes to products other than nitrocyclohexane. We prefer to distill from a neutral or slightly acid solution since nitrocyclohexane in the presence of excess base is converted to the aci-salt form and since this salt is not volatile, it does not distill with steam.

We claim:

1. A method for producing pure nitrocyclohexane, which comprises distilling a solution of a compound of the formula:

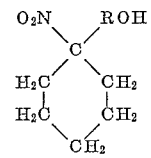

wherein R is a radical of the group consisting of methylene and lower alkyl substituted methylene radicals, and recovering the pure nitrocyclohexane from the distillate.

2. The method of claim 1, wherein R contains 1–3 carbon atoms.

3. The method of claim 2, wherein R stands for a —$CH_2$-radical.

4. The method of claim 3, wherein said recovering comprises redistilling at least a part of the distillate of said step of distilling to recover pure nitrocyclohexane.

5. The method of claim 4, wherein said step of distilling comprises steam distilling, and wherein the distillate of said step of distilling contains an oily layer and an aqueous layer, and wherein said step of redistilling comprises redistilling the oily layer, the method further including extracting pure nitrocyclohexane from said aqueous layer of the distillate to recover additional amounts of nitrocyclohexane.

6. A method for purifying nitrocyclohexane, which comprises contacting to be purified nitrocyclohexane with formaldehyde or acetaldehyde in an alkaline medium, distilling the reaction mass to form a distillate, and recovering further comprises extracting pure nitrocyclo- 7. The method of claim 6, further comprising neutralizing the reaction mass after said step of contacting.

8. The method of claim 6, further comprising acidifying the reaction mass after said step of contacting.

9. The method of claim 6, wherein the distillate contains an oily layer, and said step of recovering comprises redistilling the oily layer to recover pure nitrocyclohexane.

10. The method of claim 9, wherein the distillate further contains an aqueous layer, and said step of recovering further comprises extracting pure nitrocyclohexane from said aqueous layer.

11. The method of claim 10, further comprising neutralizing the reaction mass after said step of contacting.

12. The method of claim 10, further comprising acidifying the reaction mass after said step of contacting.

No references cited.

CARL D. QUARFORTH, *Primary Examiner.*

UNITED STATES PATENT OFFICE
CERTIFICATE OF CORRECTION

Patent No. 3,194,845            July 13, 1965

Bernard Taub et al.

It is hereby certified that error appears in the above numbered patent requiring correction and that the said Letters Patent should read as corrected below.

Column 4, line 44, strike out "further comprises extracting pure nitrocyclo-", and insert instead -- pure nitrocyclohexane from the distillate. --.

Signed and sealed this 25th day of January 1966.

(SEAL)
Attest:

ERNEST W. SWIDER            EDWARD J. BRENNER
Attesting Officer            Commissioner of Patents